United States Patent [19]
Handig

[11] Patent Number: 5,857,009
[45] Date of Patent: Jan. 5, 1999

[54] METHOD AND APPARATUS FOR PROPAGATION DELAY DETERMINATION

[75] Inventor: U. Peter Handig, Hanige, Sweden

[73] Assignee: Telefonaktiebolaget LM Ericsson, Stockholm, Sweden

[21] Appl. No.: 588,217

[22] Filed: Jan. 18, 1996

[51] Int. Cl.$^6$ .......................... H04M 1/00; H04M 15/00; H04J 1/00

[52] U.S. Cl. .......................... 379/34; 379/134; 379/219; 370/235; 370/253; 370/357

[58] Field of Search .................................. 379/1, 32, 34, 379/111, 112, 133, 134, 135, 136, 219, 220, 229, 230; 370/522, 357, 359, 229, 238, 235, 253, 252

[56] References Cited

U.S. PATENT DOCUMENTS

| Re. 33,535 | 2/1991 | Cooper. |
|---|---|---|
| 4,218,705 | 8/1980 | Inaba et al.. |
| 4,313,135 | 1/1982 | Cooper. |
| 5,054,021 | 10/1991 | Epps. |
| 5,115,431 | 5/1992 | Williams et al.. |
| 5,555,295 | 9/1996 | Bhusri .................................... 379/112 |

FOREIGN PATENT DOCUMENTS

| 387 789 | 9/1990 | European Pat. Off.. |
|---|---|---|
| 34 31 420 | 10/1985 | Germany. |
| WO95/12265 | 5/1995 | WIPO. |

OTHER PUBLICATIONS

Recommendation Q. 763, Formats and Codes of the ISDN User Part of Signalling System No. 7, pp. 12, 40, ITU–T (Mar. 1993).

Recommendation Q.764, Signalling System No. 7—ISDN User Part Signalling Procedures, pp. 26, 27, ITU–T (Mar. 1993).

ETS 300 334, Integrated Services Digital Network (ISDN): Routing in Support of ISDN User Part (ISUP) Version 2 Services, pp. 11, 17–19, European Telecom. Standards Inst. (Jun. 1993).

A. Folkestad et al., "Impact of UPT Services on Network Performance and Call Set–Up Times: Distribution of UPT Service Logic in SS7," International Switching Symposium '95, vol. 2, pp. 97–101 (23 Apr. 1995).

A.R. Modarressi et al., "An Overview of Signaling System No. 7," Proceedings of the IEEE, vol. 80, No. 4, pp. 590–606 (Apr. 1992).

R.A. Skoog, "Study of Clustered Arrival Processes and Signaling Link Delays," Teletraffic and Datatraffic in a Period of Change: Proceedings of the Thirteenth ITC, pp. 61–66 (19 Jun. 1991).

*Primary Examiner*—Paul Loomis
*Attorney, Agent, or Firm*—Burns, Doane, Swecker & Mathis, L.L.P.

[57] ABSTRACT

Methods and apparatus for assessing propagation delay based on factors in addition to the propagation delay associated with a selected circuit, in order to provide a more accurate propagation delay value associated with a communication transaction. Factors to be assessed include the propagation delays associated with a particular bearer service involved in the communication transaction, a type of information being transmitted, any supplementary peripheral equipment involved with the communication transaction, any transmission media involved with the call, and/or any combination of these factors in a communication transaction.

22 Claims, 5 Drawing Sheets

METHOD AND APPARATUS FOR PROPAGATION DELAY DETERMINATION

BACKGROUND

This invention generally relates to systems for tracking propagation delays associated with various communications through a central office switch, or other comparable communication node, in a public telephone network. In particular, the invention provides methods and apparatus for accurately determining a propagation delay associated with a particular communication transaction in a network having common channel signaling, such as Signaling System 7 (SS7), by assessing propagation delays associated with the provision of a particular bearer service, transmission path delays, impacts depending on an information type transmitted and transmission devices involved, or any combination of these.

Figure 1:
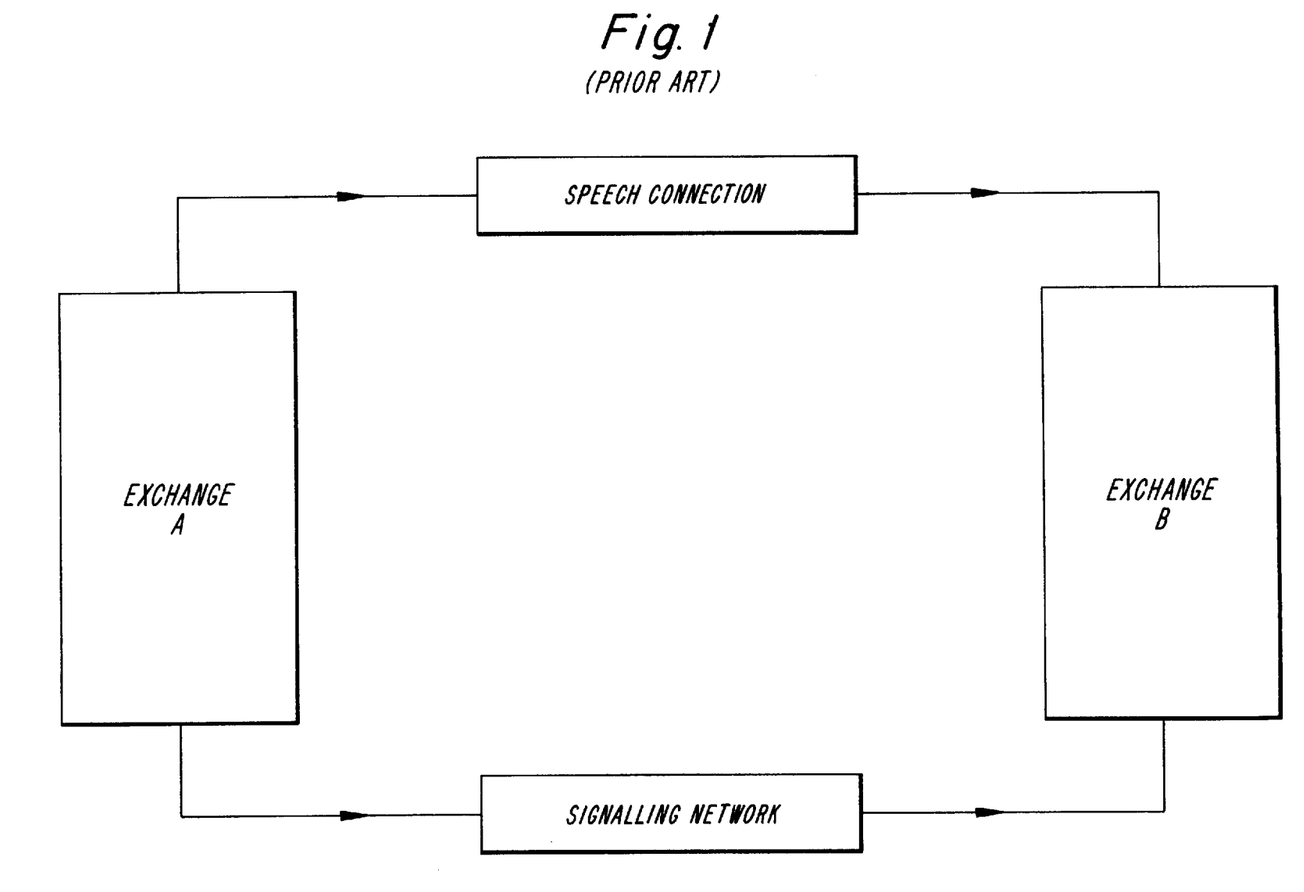
FIG. 1 shows a speech connection and a signaling network for separately carrying speech data and control messages, respectively.

A telecommunications environment having a common signaling protocol is one in which central office exchanges share a common interfacing language. Hence, no translation or interpretation of messages between exchanges is required. SS7 is a common signaling protocol that has been globally adopted. An SS7 network contains dedicated signaling channels that are separate from voice or data paths or links and that are used for control messaging. This is illustrated in FIG. 1, which shows a separate speech connection and signaling network for carrying speech data and control messages, respectively, between exchanges A and B. Although the signaling messages are separated from the speech, each signaling message is associated with a specific speech connection. All signaling messages for setting up and releasing a call travel through a dedicated signaling channel, that may be shared by signaling messages for several calls.

The signaling channel can be physically separated from the speech path, i.e., take a different route through the communication network. As a result, a propagation delay procedure such as that described here is needed. Since signaling messages can be routed a different way through the communication network, propagation delay measurements on a signaling path are typically not useful for a speech path.

A call in an SS7 supported network is basically completed as follows. A calling party dials the phone number of a called party. The dialed digits are received by the originating exchange and an Initial Address Message (IAM) is generated that contains the dialed digits and other information. The IAM is routed through the network to the terminating exchange based on dialed digits and transmission requirements. When the IAM is routed through the network, it may pass through one or more intermediate exchanges. When the IAM is received at the terminating exchange, the called party's line is checked. The called party's line status (busy/idle) is returned back to the originating exchange. If the line is busy, the call is released; if the line is idle, the subscriber is alerted in an appropriate way. If there is an answer, the terminating exchange sends an answer or connect message back toward the originating exchange, at which point call set-up is completed. The call is then in a so-called active phase, in which the originating party and the terminating party have successfully entered into a connection with one another.

A communication transaction in a telecommunication environment is any part of a call set up or call completion. A communication transaction may involve any communication means such as a central office exchange, toll or gateway exchange, land based communication node, cellular base station, microwave or satellite link, or any other connection between the aforementioned, or like, communication devices.

Propagation delay is that amount of time required by a signal to travel from a source to a receiver. Propagation delay information is accumulated during call set-up (communication set-up) in a forward direction (i.e., from the originating exchange toward the terminating exchange). The accumulated propagation delay information is sent back toward the originating exchange before the call enters the active phase.

The assessment of the propagation delay information is based on increasing a propagation delay counter (PDC) contained in the IAM as the call is set up. The accumulated result is sent in a backward direction (back to the originating exchange) within a call history information parameter in the answer or connect message.

In accordance with the International Telecommunication Union standard ITU-T Q.764 for SS7 standards regarding ISDN User Part (ISUP) signaling procedures, propagation delay information associated with a communication transaction is to be maintained. An initiating exchange includes the propagation delay counter in the IAM. Initially, the counter is set to zero milliseconds (ms), or if a propagation delay value is known (having been predetermined for each of the various circuits available to the initiating exchange), the counter is set to that value. Depending on the route (circuit) selected to the terminating or succeeding exchange, the originating or preceding exchange increases the PDC by the value representing the appropriate delay value (for the selected circuit) prior to sending the IAM. The value of the delay for each circuit is typically maintained in an exchange. If the chosen circuit includes a satellite link, a satellite indicator is set accordingly.

Upon receipt of the call history information parameter in the answer or connect message, the initiating exchange stores the received data value until the call is released. If an intermediate exchange (between the originating and terminating exchanges) is involved in the call, such as a national transit exchange, outgoing gateway exchange, toll exchange, or international outgoing exchange, appropriate adjustment of the PDC is required in the intermediate office for the particular circuits selected.

Upon receipt of the IAM, the intermediate exchange analyzes IAM routing information, including PDC information, in order to select an appropriate circuit for connection to a succeeding exchange. After such a circuit is selected, the propagation counter is increased by a value corresponding to the delay value associated with the selected circuit. This value is made available in the intermediate exchange. The IAM is sent to the succeeding exchange containing the new value of the PDC. When the call enters the active phase, the intermediate exchange relays the received answer or connect message back toward the originating exchange which message includes the call history information parameter, and consequently the accumulated PDC value.

A terminating exchange is the exchange (e.g., the destination central office) in which the PDC assessment is completed. Upon receipt of the IAM in the terminating exchange, the exchange increases the PDC by the delay value of a terminating access, if available, and stores the PDC until the call is released. The terminating exchange, prior to sending the answer or connect message back to a preceding exchange, updates the call history information parameter according to the stored value of the propagation delay counter.

In addition to communications between exchanges having common protocols, there are two basic interworking scenarios where offices having different signaling protocols interact. The first scenario is where an office that provides a signaling system that supports the PDC update procedure (supported) initiates a call set up with an office having a signaling system that does not support the PDC update procedure (unsupported). The second scenario is where an unsupported office initiates a call set up with a supported office.

In the case of an interworking situation where a supported office initiates a call to an unsupported office, the supported exchange stores the propagation delay value accumulated up to the present point, until the call is released. If a delay value referring to the unsupported part of the connection is available, the delay is added to the delay value stored in the supported exchange. Otherwise, the supported exchange acts as a terminating exchange. Upon receipt of an answer or connect message back from the unsupported office, the supported exchange includes the call history information parameter set to the stored delay value. The answer or connect message, including the call history information parameter, is sent to the preceding exchange by the supported exchange.

In the case of an interworking situation where an unsupported office initiates a call to a supported office, the unsupported exchange typically does not have signaling containing a propagation delay counter. In such a case the supported exchange inserts the propagation delay counter in the IAM resetting it to zero ms. If a delay value referring to the unsupported part of the connection is available, the propagation delay counter shall be set to this delay value. Otherwise, the supported exchange acts as an initiating exchange. The calculated delay value in the supported exchange reflects the delay incurred on the preceding circuit (s). This includes delay values corresponding to satellite delays, if applicable. Prior to sending an IAM to a succeeding exchange, the propagation delay counter in the supported exchange is increased according to the delay value of the circuit selected.

In the situation where the incoming exchange is supported, but where the IAM does not contain the propagation delay counter parameter, a propagation delay value is created just as it would be when there is interworking from an unsupported exchange to a supported exchange. If a supported exchange receives an answer or connect message from which the call history information parameter is missing, no special action is required as the answer or connect message is sent backward without this parameter. If a supported exchange receives a confusion message referring to the PDC, or to the call history information parameter, both the confusion message and any stored propagation delay value are discarded.

A confusion message (CFN) is an SS7 message that indicates that unrecognized information has been received. Because an SS7 exchange supports interworking with different versions of SS7 exchanges, the SS7 exchange may receive information that is not within the exchange's communication protocol. The CFN message is used to inform the sending exchange that it has sent information that the receiving exchange could not understand. The CFN message indicates what action, if any, was taken (e.g., whether the received information was passed on or discarded), as well as information about what type of information was not understood.

In the above-described ITU-T propagation delay procedures, the delay value is set solely according to the delay associated with a selected circuit. Such a procedure fails to take into consideration the fact that different delays can exist on the same circuit depending on the particular bearer service being provided. Bearer services include voice, data, and video communications. The above identified standard also neglects a number of additional factors that may impact the propagation delay value. These include delays associated with the utilization of supplementary network equipment in combination with bearer services. Hence, the ITU-T procedures mandate a propagation delay tracking standard in which the propagation delay information may be inaccurate, or at best, a crude estimate of an actual value.

Accurate propagation delay information is needed for a number of reasons, including provision of a determination factor for utilizing echo suppression systems or other signal processing to maintain communication signal quality. Accurate propagation delay information also can facilitate enhanced routing determination, more effective selection of circuits, and more efficient use of network resources. If propagation delay becomes too great, there is degradation in communication quality. Hence it is desirable to maintain propagation delay at a manageable level.

For instance when a call having a relatively high propagation delay value is received in an exchange, it is desirable that a circuit with a relatively low delay value be selected to avoid unduly increasing the accumulated propagation delay. Conversely, when a call whose propagation delay value is relatively low is received, it may be acceptable to select a circuit with a relatively high delay value, thus saving low delay circuits for use in high delay calls. Hence, in order to make the most efficient use of exchange resources without degrading communication quality and to avoid reliance on undue echo suppression or signal processing, the most accurate propagation delay information should be maintained.

In accordance with the invention, methods and apparatus are provided for maintaining more accurate propagation delay information compared to that prescribed by the ITU-T standards discussed above.

SUMMARY

Methods and apparatus in accordance with the invention provide a propagation delay assessment, based on factors beyond the propagation delay value associated with a selected circuit, to provide an accurate propagation delay value for a communication transaction. Factors assessed include propagation delays associated with a particular bearer service involved in the communication transaction, supplementary peripheral equipment involved with the communication transaction, transmission medium(s) involved, the type of information being communicated, or any combination of these factors.

The propagation delay information gathered in accordance with Applicant's invention can be used to more effectively manage network resources, determine routes, and select circuits.

In particular, a method is disclosed for updating a propagation delay counter associated with a communication transaction by determining a first propagation delay value associated with a bearer service being provided in association with the communication transaction; and updating the propagation delay counter with the first propagation delay value. Also taken into consideration in providing the PDC update information are the delay associated with a particular information type and any supplementary equipment involved in the communication transaction.

In another aspect of the invention, a method of selecting a circuit in a communication device involved in a communication transaction includes the steps of determining a first propagation delay value associated with a bearer service being provided in association with the communication transaction; determining propagation delays associated with available circuits; and selecting a circuit having a propagation delay value that, when added to the first propagation delay value, results in a total propagation delay for the communication transaction that is less than a threshold.

In yet another aspect of the invention, an apparatus for updating a propagation delay counter associated with a communication transaction includes a device for determining a first propagation delay value associated with a bearer service being provided in association with the communication transaction; and a device for updating the propagation delay counter with the first propagation delay value. The apparatus may further include a device for determining a type of information involved in the communication transaction; a device for determining a second propagation delay value associated with transmitting such information type; and a device for updating the propagation delay counter with the second propagation delay value.

In another aspect, the apparatus may include a device for determining a third propagation delay value associated with supplementary peripheral equipment utilized in the communication transaction; and a device for updating the propagation delay counter with the third propagation delay value.

BRIEF DESCRIPTION OF THE DRAWINGS

The features and advantages of Applicant's invention will be apparent from reading this description in conjunction with the drawings, in which.

DETAILED DESCRIPTION

Systems in accordance with the invention maintain and account for bearer-service-specific propagation delay data, propagation delays associated with a particular information type involved, as well as propagation delay impact involved with the use of supplementary equipment. This information is used to update the PDC in the IAM and/or answer or call connect message. In accordance with the invention, a propagation delay value for a particular bearer service used in association with a communication transaction may be determined, rather than the ITU recommendation of only considering the propagation delay value associated with a circuit. If supplementary equipment is utilize in the communication transaction, any propagation delay associated with its use, or with its use in combination with a particular bearer service or transmitted information type, is accounted for. Systems embodying the invention also may involve evaluation of propagation delays associated with different transmission media. These additional propagation delay values may be used, as necessary, to update the propagation delay counter in order to provide a more accurate value for the propagation delay associated with the communication transaction.

Figure 2:
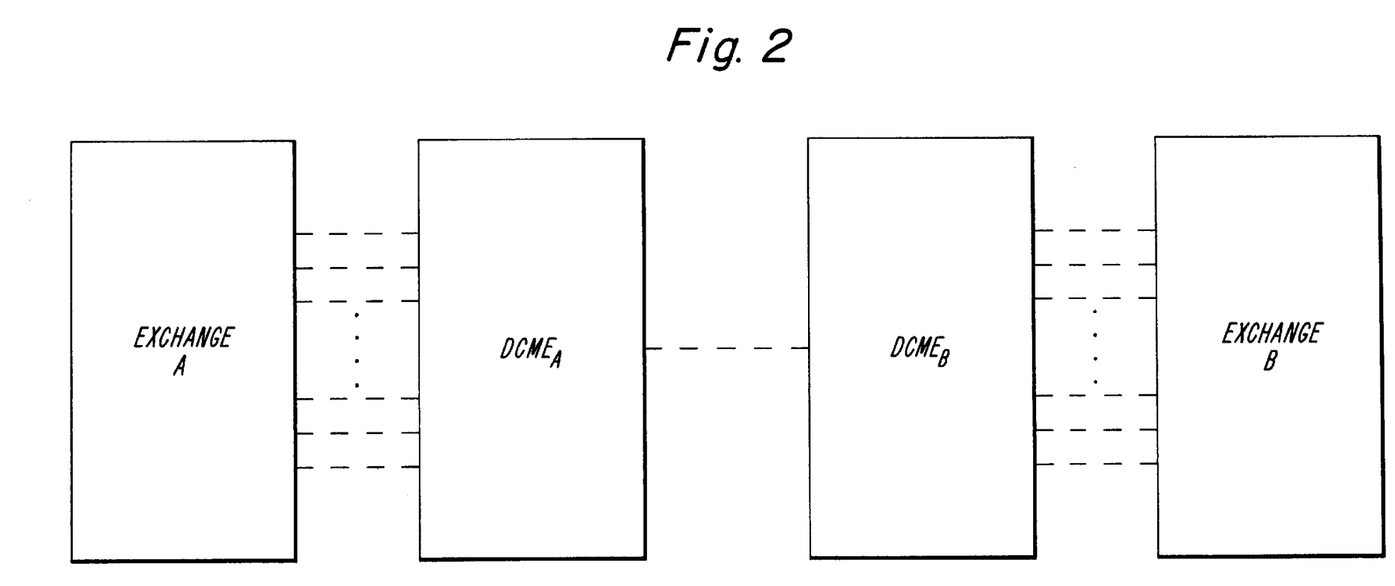
FIG. 2 depicts a digital compression device used in conjunction with a central office switch.

There are a number of techniques and devices that can be provided in the peripheral portion of an exchange, or node, in order to more efficiently utilize inter-exchange physical circuits. One such supplementary peripheral device, shown in FIG. 2, is digital circuit multiplication equipment (DCME) for compressing digital information. As shown, a first central office (Exchange A) communicates with a second central office (Exchange B) through respective $DCME_A$ and DCMEB, which compress the information transferred prior to its transmission.

Other peripheral devices may include signal processing equipment for echo suppression treatment. Echo signals may be produced in communications system by, for example, transmission medium propagation delays, four-wire to two-wire transitions, and/or hands-free telephone arrangements such as speakerphones. In order to offset echo signals, signal processors such as echo cancellation devices or echo suppression processors may be provided.

Different information types, and/or bearer services, such as coded and uncoded voice and 64 Kbps unrestricted data transmission, entail different propagation delays when processed through a DCME, echo signal processor, or other peripheral device. For example, voice data compression in a DCME typically results in a propagation delay of between 20 ms and 30 ms because large portions of a typical speech signal contain silence. However, voice requires at least 3.1 KHz of capacity to maintain a required level of quality. Consequently, the extent to which a DCME may compress voice data might be limited. On the other hand, 64 Kbps is a guaranteed capacity having a required bit integrity, and does not undergo DCME compression processing. Therefore, 64 Kbps unrestricted data transmission only suffers a 1–10 ms delay when passing through a DCME. Table 1 illustrates propagation delays associated with use of DCME equipment.

TABLE 1

Propagation Delays Associated with use of DCME Equipment

| Information Type | Propagation Delay |
|---|---|
| 64 Kbit/s | 1–10 ms |
| 3.1 KHz | ≈4 ms |
| Voice | 20–30 ms |

This illustrates the limitations of assigning a fixed propagation delay to a circuit. Under the ITU mandates, the propagation delay value used to update the PDC would simply be the delay value assigned to the circuit selected, without regard to the additional delay brought about by the use of the DCME in the communication transaction.

Another factor to consider with use of supplementary peripheral devices is whether they may be invoked for transmission of a particular information type that a user is providing when a particular bearer service is invoked. All calls processed through an SS7 supported network have a dedicated PCM 64 Kbps time slot independent of whether the information type is voice, 3.1 KHz, or 64 Kbps data. (Video information can be treated as 64 Kbps data.) The different information types are, however, treated differently in the case of, for example, compression processing. If the information type is voice, the network may provide compression processing, but such processing is not typically used in 64 Kbps data transmission. It is worth noting that the inherent delay in a transmission medium always remains the same; however, if data compression or echo processing equipment is used, the propagation delays may be different depending on the bearer service provided. (It will be appreciated that an information type is something that a user provides to the network to set up a connection with a specific bearer service.)

The characteristics of a particular transmission medium also may have an impact on a propagation delay associated with a communication transaction. A transmission medium may be evaluated to determine its propagation delay. Table 2 lists some common transmission media and their associated propagation delays.

TABLE 2

Propagation Delays Associated with use of Particular Transmission Mediums

| Transmission medium | One-way Propagation Delay |
| --- | --- |
| Coaxial Cable/Radio Link | 0.004 ms/km |
| Optical Fiber | 0.005 ms/km |
| Digital Mobile Network | 90 ms |
| Satellite | 260 ms |

Each of the above-identified propagation delay factors may be evaluated to provide a more accurate delay value for updating the PDC. Use of this PDC information enables the selection of an appropriate circuit that has a propagation delay whose additional value does not result in the PDC exceeding a threshold indicative of service quality degradation.

Maintenance and tracking of the various propagation delays can be handled by administrative modules within a central office switch or communication node. In an exemplary embodiment depicted in FIG. 3, a central office switch 20 is shown having a central call processing module 16 containing administrative means 18 for tracking and maintaining propagation delay information associated with communication transactions within the switch 20. The administrative means 18 may work in concert with a SS7 module 22, containing a peripheral interface and control module 24 and circuits 25 for gathering information for maintaining the PDC for a particular communication transaction. The administrative means 18 operates in connection with a peripheral portion 14 through communication between the peripheral interface and control module 24 and a central interface module 26.

Figure 3:
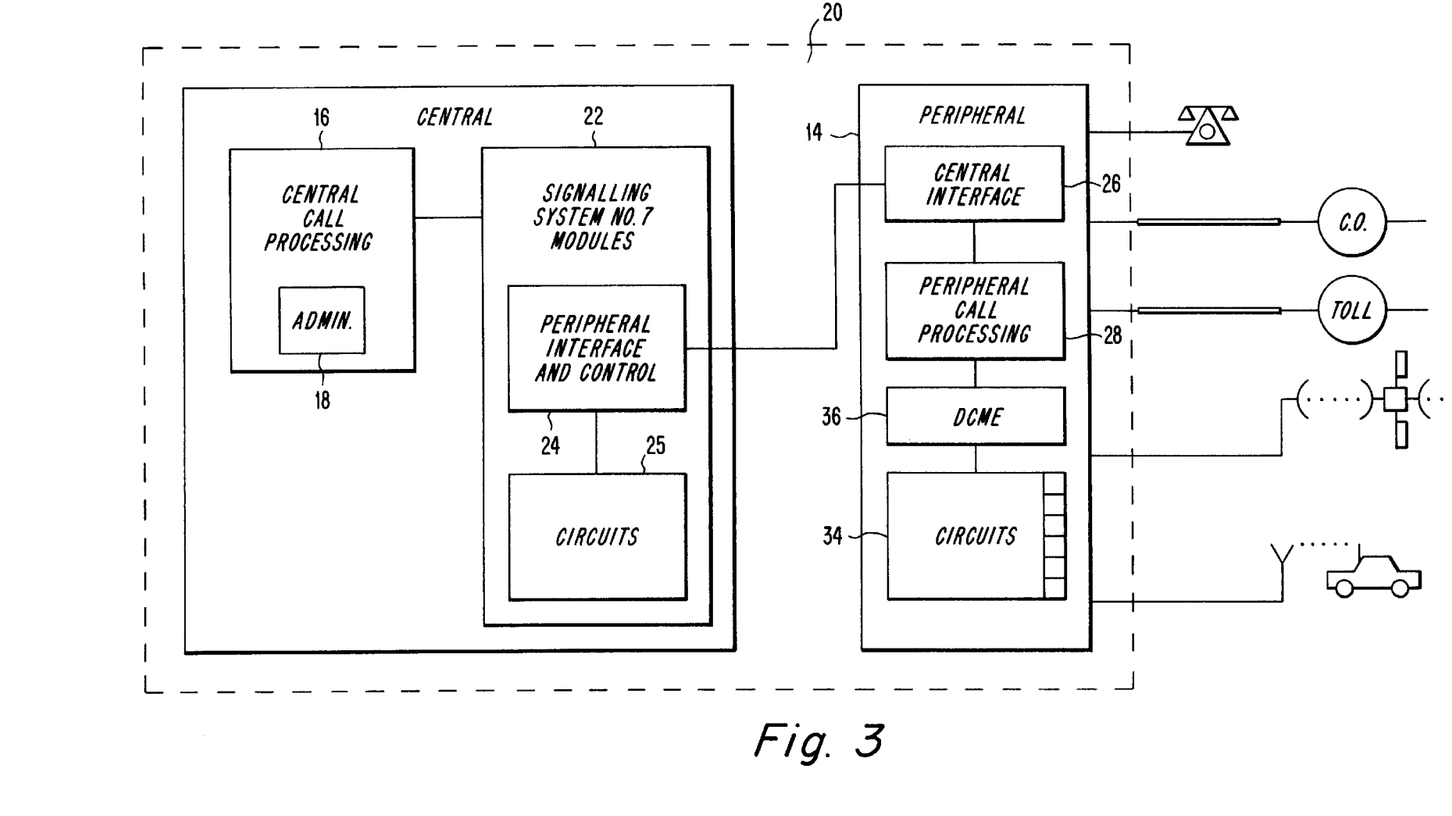
FIG. 3 depicts a central office switch arrangement incorporating Applicant's invention.

The central interface module 26 communicates with various peripheral components through a peripheral call processing module 28 that is responsible for controlling and administering peripheral equipment such as DCME 36, circuits 34, and other peripheral hardware elements. For instance, the peripheral call processing module 28 can track propagation delay information corresponding to a communications scenario in which the DCME 36 is utilized for compressing information that is subsequently decompressed by a DCME (not shown) in another central office C.O. As illustrated in FIG. 3, the peripheral portion 14 is also used for communicating with a subscriber set, and with toll lines, satellite links and radio links.

Figure 5:
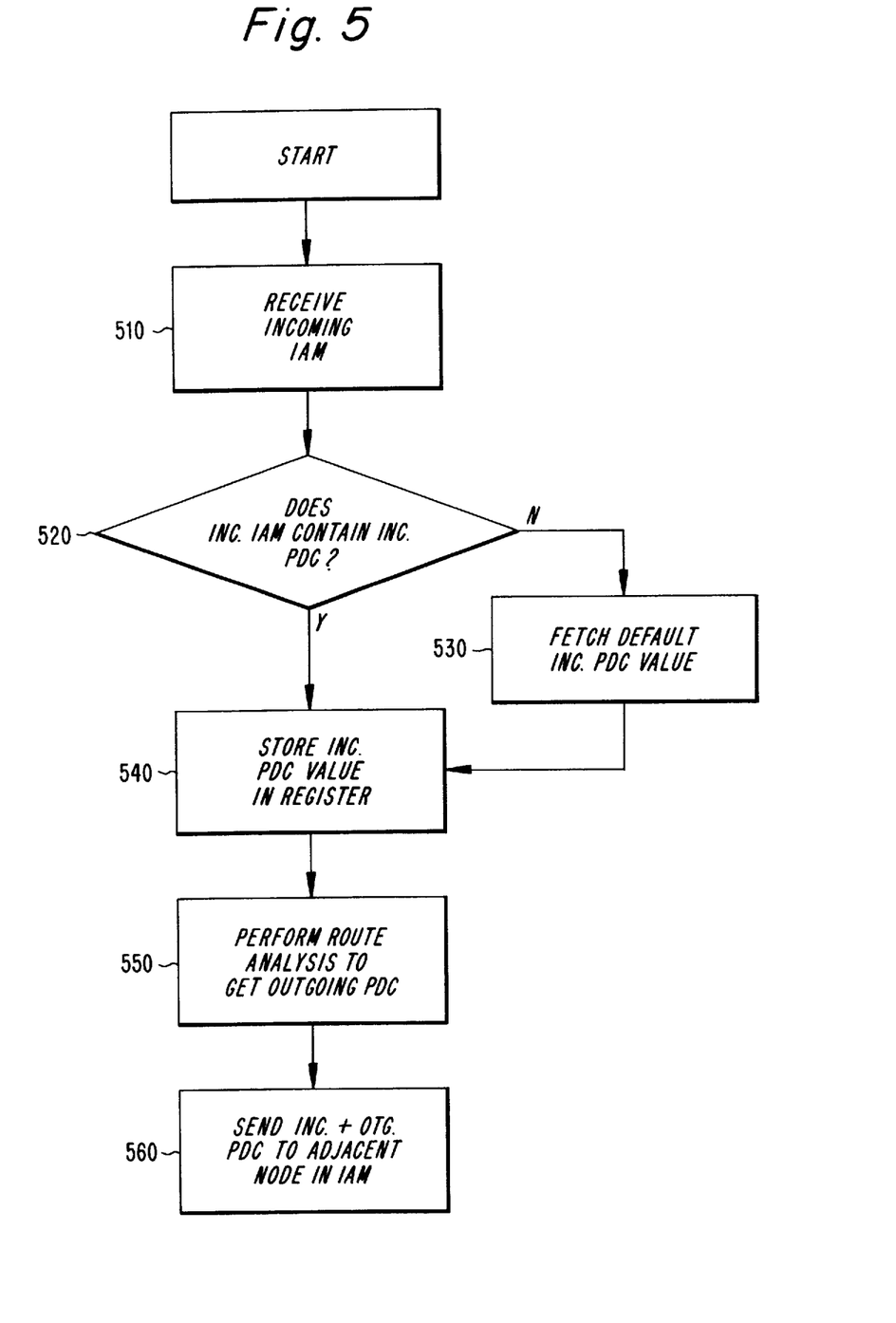
FIG. 5 is a flow diagram illustrating management of Propagation Delay Counters in accordance with exemplary embodiments of the invention.

FIG. 5 is a flow diagram of an exemplary embodiment for administration of the PDC in a typical call scenario in which a communications node is in the process of setting up a call with an adjacent node. When an IAM is received on an incoming circuit at block 510, the IAM is analyzed at decision block 520 to determine whether it contains incoming PDC information (INC PDC). If the IAM does contain INC PDC, that PDC value is stored in a register at block 540. If the IAM does not contain a PDC value, a default PDC value is fetched at block 530, and stored in the register at block 540. Once an incoming PDC is established, a route analysis is performed to obtain an outgoing circuit and the outgoing circuit's PDC (OTG PDC), thereby determining a PDC value to be inserted in an outgoing IAM sent to the adjacent node (see block 560).

Figure 4:
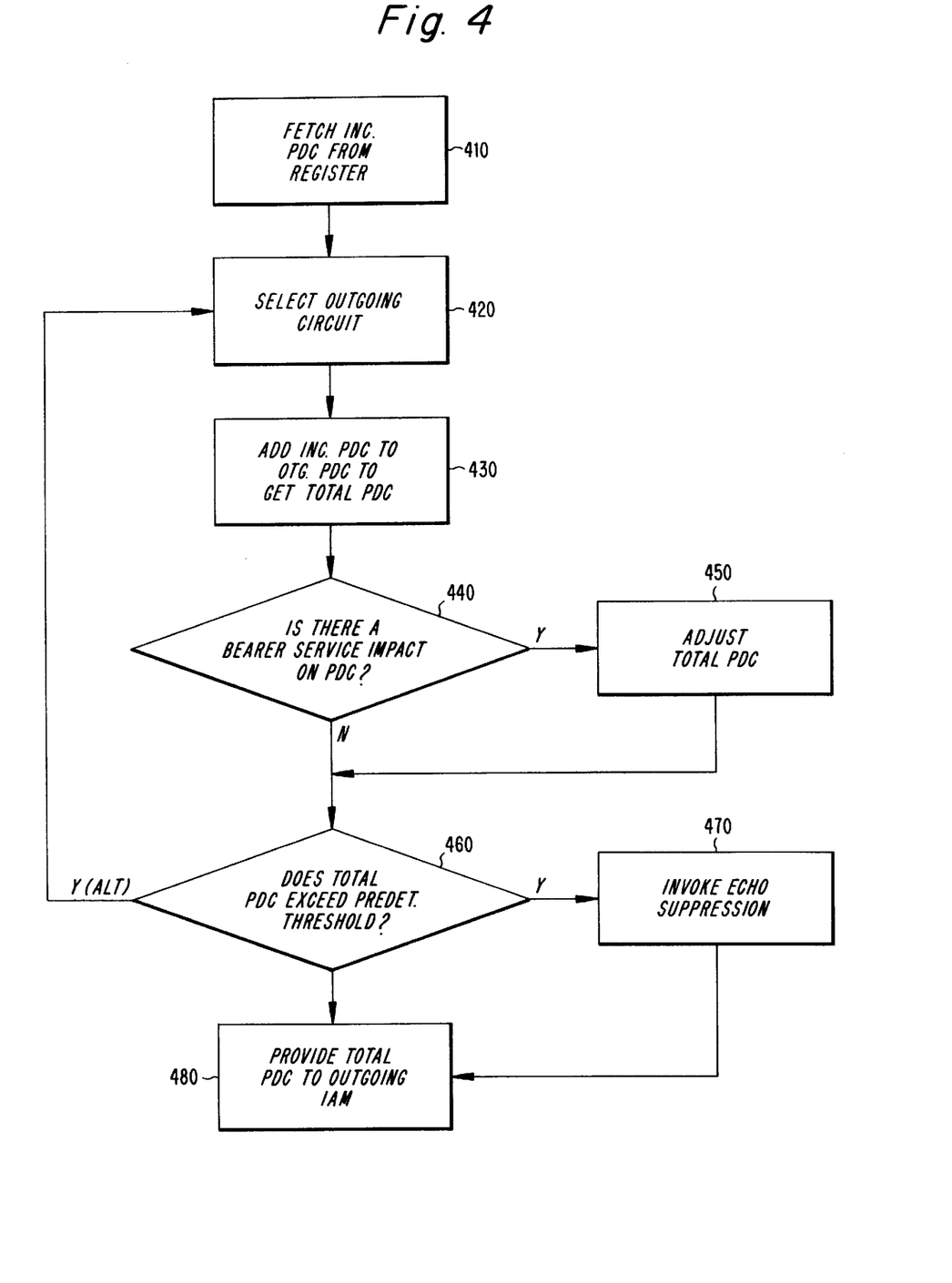
FIG. 4 is a flow diagram illustrating a route analysis in accordance with an embodiment of the invention.

FIG. 4 is a flow diagram of an exemplary routing analysis that can be invoked in blocks 550 and 560 in FIG. 5. As an initial step, the INC PDC is fetched from the register at block 410. An outgoing circuit is selected at block 420 and its PDC value (OTG PDC) is added to the INC PDC at block 430 to give a total PDC. A determination is made at decision block 440 as to whether there is a bearer service impact on the total PDC. If there is a bearer service impact, the total PDC is correspondingly adjusted at block 450. Whether adjusted at block 450 or not, the total PDC is analyzed at decision block 460 to determine whether it exceeds a predetermined threshold value. If so, one of several remedial measures can be taken.

In accordance with one embodiment of the invention, invocation of echo suppression can be provided (see block 470). In accordance with another exemplary embodiment, outgoing circuit selection (step 550 in FIG. 5) can be performed again until a circuit is selected that provides a total PDC that is less than a predetermined threshold. The total PDC is provided for insertion into the outgoing IAM at block 480.

Of course, selection of the outgoing circuit can be based on selecting only an outgoing circuit that results in a total PDC that is less than the threshold value, in which case the total PDC is checked merely for bearer service interaction and then provided for inclusion in the outgoing IAM. It should be noted that in addition to a check for bearer service interaction at block 440, systems in accordance with the invention can also check, and appropriately adjust the total PDC, for impacts based on transmission media, supplementary peripheral devices associated with a call (e.g., data compression devices), and an information type involved.

The particular manner of administration, collection and communication of the propagation delay information associated with Applicant's invention, in software or otherwise, is not critical to the invention, and may be carried out in any manner necessary to achieve the desired result as described above.

It will be understood that Applicant's invention is not limited to the particular embodiments that have been described and illustrated. This application contemplates any and all modifications that fall within the spirit and scope of Applicant's invention as defined by the following claims.

What is claimed is:

1. A method of updating a propagation delay counter associated with a communication transaction, the method comprising the steps of:

determining a first propagation delay value associated with a bearer service being provided in association with the communication transaction;

updating the propagation delay counter with the first propagation delay value;

determining a type of information involved in the communication transaction;

determining a second propagation delay value associated with transmitting such information type; and updating the propagation delay counter with the second propagation delay value.

2. A method of updating a propagation delay counter associated with a communication transaction, the method comprising the steps of:

determining a first propagation delay value associated with a bearer service being provided in association with the communication transaction;

updating the propagation delay counter with the first propagation delay value; determining a type of information involved in the communication transaction;

determining if supplementary peripheral equipment is being utilized in providing a bearer service in association with the communication transaction;

determining a second propagation delay value for use of the supplementary peripheral equipment in association with the type of information involved in the communication transaction; and updating the propagation delay counter with the second propagation delay value.

3. The method of claim 1, wherein the type of information involved in the communication transaction is selected from the group comprising voice, data, and video.

4. The method of claim 1, wherein the bearer service involved in the communication transaction is selected from the group comprising speech, 3.1 KHz, and 64 Kbps.

5. A method of updating a propagation delay counter associated with a communication transaction, the method comprising the steps of:

determining a first propagation delay value associated with a bearer service being provided in association with the communication transaction;

updating the propagation delay counter with the first propagation delay value, determining a second propagation delay value associated with use of supplementary peripheral equipment in providing the bearer service in the communication transaction; and updating the propagation delay counter with the second propagation delay value, wherein the supplementary peripheral equipment is selected from the group comprising data compression devices and echo cancellation devices.

6. The method of claim 1, further comprising the steps of:

determining the propagation delay value of a circuit involved in the communication transaction; and updating the propagation delay counter with the circuit propagation delay value.

7. The method of claim 1, further comprising the steps of:

determining the propagation delay value associated with a transmission medium involved in the communication transaction; and updating the propagation delay counter with the transmission medium propagation delay value.

8. A method of selecting a circuit in a communication means involved in a communication transaction, the method comprising the steps of:

determining a first propagation delay value associated with a bearer service being provided in association with the communication transaction;

determining propagation delays associated with available circuits; and selecting a circuit having a propagation delay value, which circuit propagation delay value, when added to the first propagation delay value, results in a total propagation delay for the communication transaction which total propagation delay is less than a threshold, wherein avoidance of degradation of communications quality involves selecting a circuit having a relatively small propagation delay value when the sum propagation delay value is relatively large.

9. A method of selecting a circuit in a communication means involved in a communication transaction, the method comprising the steps of:

determining a first propagation delay value associated with a bearer service being provided in association with the communication transaction;

determining propagation delays associated with available circuits; and selecting a circuit having a propagation delay value, which circuit propagation delay value, when added to the first propagation delay value, results in a total propagation delay for the communication transaction which total propagation delay is less than a threshold, wherein avoidance of degradation of communications quality involves selecting a circuit having a relatively large propagation delay value when the sum propagation delay value is relatively small.

10. An apparatus for updating a propagation delay counter associated with a communication transaction, comprising:

means for determining a first propagation delay value associated with a bearer service being provided in association with the communication transaction;

means for updating the propagation delay counter with the first propagation delay value;

means for determining a type of information involved in the communication transaction;

means for determining a second propagation delay value associated with transmitting such information type; and means for updating the propagation delay counter with the second propagation delay value.

11. An apparatus for updating a propagation delay counter associated with a communication transaction, comprising:

means for determining a first propagation delay value associated with a bearer service being provided in association with the communication transaction;

means for updating the propagation delay counter with the first propagation delay value;

means for determining if supplementary peripheral equipment is being utilized in association with the communication transaction;

means for determining a second propagation delay value associated with utilizing such supplementary peripheral equipment in combination with the type of information involved in the communication transaction; and means for updating the propagation delay counter with the second propagation delay value.

12. The apparatus of claim 10, wherein the type of information involved in the communication transaction is selected from the group comprising voice, data, and video.

13. An apparatus for updating a propagation delay counter associated with a communication transaction, comprising:

means for determining a first propagation delay value associated with a bearer service being provided in association with the communication transaction;

means for updating the propagation delay counter with the first propagation delay value;

means for determining a second propagation delay value associated with supplementary peripheral equipment utilized in the communication transaction; and means for updating the propagation delay counter with the second propagation delay value, wherein the supplementary peripheral equipment is selected from the group comprising data compression devices and echo canceling devices.

14. The apparatus of claim 10, further comprising:

means for determining the propagation delay value of a circuit involved in the communication transaction; and means for updating the propagation delay counter with the circuit propagation delay value.

15. The apparatus of claim 10, further comprising:

means for determining the propagation delay value associated with a transmission medium involved in the communication transaction; and means for updating the propagation delay counter with the circuit propagation delay value.

16. The method of claim 8, wherein the threshold is selected to ensure that the total propagation delay value for the communication transaction does not result in a degradation of communication quality.

17. The method of claim 8, further comprising the steps of:

determining a second propagation delay value corresponding to a utilization of supplementary peripheral equipment in association with the communication transaction; and determining a sum propagation delay value by adding the first and second propagation delay values.

18. The method of claim 8, further comprising the steps of:

determining a second propagation delay value associated with one or more transmission mediums over which information is transmitted in association with the communication transaction; and updating the sum propagation value with the second propagation delay value.

19. The method of claim 9, wherein the threshold is selected to ensure that the total propagation delay value for the communication transaction does not result in a degradation of communication quality.

20. The method of claim 9, further comprising the steps of:

determining a second propagation delay value corresponding to a utilization of supplementary peripheral equipment in association with the communication transaction; and determining a sum propagation delay value by adding the first and second propagation delay values.

21. The method of claim 9, further comprising the steps of:

determining a second propagation delay value associated with one or more transmission mediums over which information is transmitted in association with the communication transaction; and updating the sum propagation value with the second propagation delay value.

22. The apparatus of claim 10, wherein the bearer service involved in the communication transaction is selected from the group comprising speech, 3.1 Khz, and 64 Kbps.

* * * * *